United States Patent [19]

Mandelbaum

[11] Patent Number: 5,477,215
[45] Date of Patent: Dec. 19, 1995

[54] ARRANGEMENT FOR SIMULTANEOUSLY INTERROGATING A PLURALITY OF PORTABLE RADIO FREQUENCY COMMUNICATION DEVICES

[75] Inventor: Richard Mandelbaum, Manalapan, N.J.

[73] Assignee: AT&T Corp., Murray Hill, N.J.

[21] Appl. No.: 100,394

[22] Filed: Aug. 2, 1993

[51] Int. Cl.[6] .............................. G07D 7/00; G08G 1/00
[52] U.S. Cl. .............................. 340/825.34; 340/825.54; 340/928; 235/380
[58] Field of Search ...................... 340/825.34, 825.54, 340/825.55, 928; 364/401; 235/380, 382, 382.5; 379/91; 455/344

[56] References Cited

U.S. PATENT DOCUMENTS

| | | | |
|---|---|---|---|
| 5,086,389 | 2/1992 | Hassett et al. | 340/928 |
| 5,131,038 | 7/1992 | Puhl et al. | 235/382 |
| 5,196,846 | 3/1993 | Brockelsby | 340/825.34 |
| 5,204,675 | 4/1993 | Sekine | 340/928 |
| 5,241,161 | 8/1993 | Zuta | 235/382 |
| 5,288,978 | 2/1994 | Iijima | 235/380 |
| 5,347,263 | 9/1994 | Carroll et al. | 340/825.54 |

OTHER PUBLICATIONS

William C. Y. Lee, Mobile Cellular Telecommunications Systems, 1989, pp. 8, 9, 25, and 26.

Primary Examiner—Donald J. Yusko
Assistant Examiner—Edward Merz
Attorney, Agent, or Firm—Samuel R. Williamson

[57] ABSTRACT

An updatable, interrogation system is provided for simultaneously interrogating a plurality of portable data cards. Operable over a plurality of radio frequencies, the interrogation system sequentially communicates with each portable data card as it comes within communication range on a first one of the plurality of radio frequencies for determining a unique identification number associated with each data card. Once the identification number for a card is obtained by the interrogation system, a predetermined transaction, such as deactivating an electronic barrier to entering a limited access area, for the holder of the identified card is initiated. The interrogation system then selects and moves with each card to a different one of the plurality of radio frequencies for completing a data transfer portion of the transaction. The interrogation system simultaneously completes each predetermined transaction of reading from and writing data to each one of the plurality of cards while communicating with each card on the respectively selected ones of the plurality of radio frequencies.

9 Claims, 5 Drawing Sheets

ARRANGEMENT FOR SIMULTANEOUSLY INTERROGATING A PLURALITY OF PORTABLE RADIO FREQUENCY COMMUNICATION DEVICES

BACKGROUND OF THE INVENTION

1. Technical Field

This invention relates to a system which uses smart cards, and more particularly, to a system which uses smart cards for processing and communicating data while in a mobile environment.

2. Description of the Prior Art

Wireless technology is fueling a major revolution in communications. This technology allows new access connections to landline networks. However, the impact of wireless is far more profound than simply being another method of access. Wireless technology allows the customer to have mobility in his or her communications and not be constrained to the tether of wired access. Wireless technology also permits the customer to gain access to an application from wherever he or she wishes, within the constraints of wireless network deployment and range.

What is still in its infant stages, however, is wireless communications which enables a user of a smart card-like device to become completely untethered when using such a device in short range wireless communications.

A number of proposals have been made with regard to providing a customer with a wireless connection for performing various financial transactions. One such proposal, for example, is described in U.S. Pat. No. 4,977,501 which issued to J. P. Lefevre on Dec. 11, 1990. This patent describes a fare collection system for operators of transport vehicles wherein information is periodically exchanged at microwave frequencies between a smart card-like ticket, held by a passenger in the vehicle, and a transceiver also in the vehicle. A credit balance initially assigned to the ticket is decremented by circuitry in the transceiver which interrogates the ticket.

Other proposals have also been made with regard to providing a holder of a smart card-like device with an identifying radio frequency signal which uniquely identifies the individual holder of the device. One proposed wireless system for providing a radio frequency emitting identifier is described in U.S. Pat. No. 4,384,288 issued to C. A. Walton on May 17, 1983. This patent describes an electronic identification system comprising a credit card-shaped identifier which generates a programmable pulse position-modulated signal in the radio frequency range for identification of the user.

It is becoming increasingly necessary to quickly and accurately identify people located at a terminal remote to a central processing station. Such identification is necessary for making financial transactions or for expediting the movement of people through electronic barriers. In such systems, the identification must be accurate and, to conserve computer time, done relatively quickly.

As wireless communication matures, it will become more and more likely that multiple smart card-like devices will be in radio range of a communication terminal thereby causing destructive interference, even if only short range communications are allowed. It is desirable, therefore, to have a wireless interrogatable and updatable system which supports multiple smart card-like devices within radio range without destructive interference.

SUMMARY OF THE INVENTION

The prior art problem is solved in accordance with the present invention by providing an updatable, interrogation system which simultaneously interrogates a plurality of portable data cards.

Operable over a plurality of radio frequencies, in accordance with the principles of the invention, the interrogation system sequentially communicates with each portable data card as it comes within radio range on a first one of the plurality of radio frequencies. On this radio frequency, the interrogation system determines a unique identification number associated with each data card. Once the identification number for a card is obtained by the interrogation system, a predetermined transaction, such as deactivating an electronic barrier to entering a limited access area, for the holder of the identified card is initiated.

In further accordance with the principles of the invention, the interrogation system selects and moves with each card to a different one of the plurality of radio frequencies for completing with the card a data transfer portion of the predetermined transaction. While on this selected one of the plurality of radio frequencies, the interrogation system completes the predetermined transaction of reading data from and writing data to the card while simultaneously communicating with other of the plurality of cards on the respectively selected ones of the plurality of radio frequencies for these cards.

BRIEF DESCRIPTION OF THE DRAWINGS

This invention and its mode of operation will be more clearly understood from the following detailed description when read with the appended drawing in which.

Throughout the drawing, the same elements when shown in more than one figure are designated by the same reference numerals.

DETAILED DESCRIPTION

The present invention relates to an interrogator system for smart cards and more particularly, to an interrogator system for smart cards capable of processing and communicating data while in a mobile environment. The interrogator system is capable of handling large volumes of traffic and will advantageously expedite the movement of people or moving objects having the smart cards attached thereto through electronic barriers. The users of the interrogator system communicate through radio frequencies (RF) with one of any of a plurality of interrogation station sites (SITEs) located in the vicinity of an electronic barrier choke point, such as a turnstile, inserted in a designated passageway for users of the system.

Figure 1:
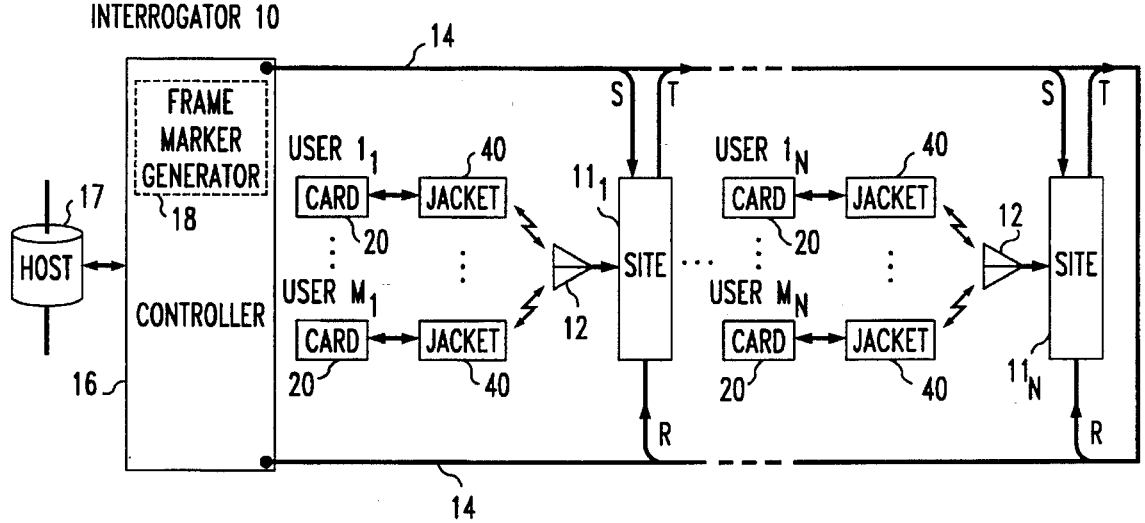
FIG. 1 is a block diagram of an interrogator system for interfacing with multiple smart cards and radio frequency jackets in accordance with the present invention.

Referring now to FIG. 1, there is shown an illustrative block diagram of an interrogator 10, including a plurality of N SITES $11_1$ through $11_N$ geographically dispersed, and their respective antennas 12, a controller 16 and a host 17. Also illustrative shown in FIG. 1, but is not a part of the interrogator 10 are smart cards 20, which are the size of a standard credit card, and pocket size enclosures or RF jackets 40 for holding each of the smart cards and providing smart card interface circuitry. It is to be understood that the smart card interface circuitry for communicating with the N SITES $11_1$ through $11_N$ could also be totally located on the card rather than in the pocket size enclosure or RF jacket as described herein.

The host 17 is typically a data base of a provider of a particular service on the smart card 20. The controller 16 may be colocated with or separated from the host 17 and contains switching, control, and all line circuits required by the host 17 for establishing, maintaining and terminating communications between the interrogator 10 and the RF jacket 40 and smart card 20. The jacket 40 performs a multitude of functions including providing operating power in the form of magnetic energy coupled from the jacket to the card 20, and also coupling data between the interrogator 10 and the card 20. Communications between the interrogator 10 and each of the RF jackets 40 may take place through either of the illustrated antennas 12.

Each smart card/jacket combination contains an associated RF transceiver 420, described later herein with reference to FIG. 7, which communicates signaling and data information within, for example, the 2.4 GHz frequency band. This data and signaling information may be communicated to any one of the plurality of N SITEs $11_1$ through $11_N$. The plurality of N SITEs are strategically distributed near designated passageways into which users of the smart card/jacket combination jacket are funneled. These passageways are sufficiently near the radiation source provided by one of the antennas 12 so that normal movement of these users will allow adequate time for complete interrogating of and any necessary writing to the card.

Each SITE $11_i$ may be accessed by, for example, up to $M_i$ simultaneous users, typically between 20 and 30, while located in its proximity. Communication between the $M_i$ users and the SITEs $11_i$ may be accomplished, for example, by Time Division Multiple Access (TDMA), Frequency Division Multiple Access (FDMA), the slotted ALOHA protocol or any other suitable method which avoids interference at a SITE while communicating with the multiple simultaneous users. For purposes of discussion, and not for purposes of limitation, it will be assumed hereinafter that the interrogator system uses FDMA techniques for communicating with the $M_i$ users.

Operable over a plurality of RF channels, the interrogator system initially sequentially communicates with each smart card/jacket combination on a first common or set-up one of the plurality of RF channels as the smart card/jacket combination comes within communication range of a SITE antenna 12.

On this first RF channel, the interrogator system determines a unique identification number associated with each card in the card/jacket combination. Once the identification number for a card is obtained by the interrogator system, a predetermined transaction for the holder of the identified card is initiated.

The interrogator system next selects a second one from the plurality of RF channels and moves with each card/jacket combination to this selected one of the plurality of RF channels for completing a data transfer portion of the predetermined transaction. The interrogator system then completes each predetermined transaction of reading and writing data to the card/jacket combination while simultaneously communicating with each card/jacket combination on its respectively selected one of the plurality of RF channels. With the frequency division multiplexing arrangement employed by the interrogator system, a large volume of card/jacket users are easily handled and the movement of these users through designated electronic barrier choke points is advantageously expedited.

In an area where there is almost always a small volume of traffic, one or two electronic barrier choke points, such as turnstiles, may be employed. Accordingly, a single SITE $11_i$ may be used for communications between the interrogator 10 and the plurality of $M_i$ users. In other areas where large volumes of traffic are periodically expected, such as during rush hour on a subway, many electronic barrier choke points are provided. The plurality of SITEs $11_i$ are accordingly increased to expedite the movement of people through these electronic barriers.

Although communication between the SITEs $11_i$ and the controller 16 may be achieved using a number of suitable methods, for purposes of discussion, and not for purposes of limitation, it will be assumed hereinafter that (a) the interrogator system 10 uses TDMA techniques along a bus; (b) each SITE $11_i$ processes the signals from the users located thereat into separate packets of information, including necessary control information, for transmission on a bus 14 to the data base illustratively shown as host 17; and (c) the interrogator system 10 uses an optical local area network (LAN) transmitting lightwave signals along a bus 14 which is an optical waveguide such as a single mode optical fiber bus. Such a system is available in the art and is described in U.S. Pat. No. 4,807,222 which issued to N. Amitay on Feb. 21, 1989. TDMA techniques are also known and are described in, for example, U.S. Pat. Nos. 4,143,241, 4,232, 266, 4,232,197, 4,188,578, 4,730,305, and 4,730,310.

Figure 5:
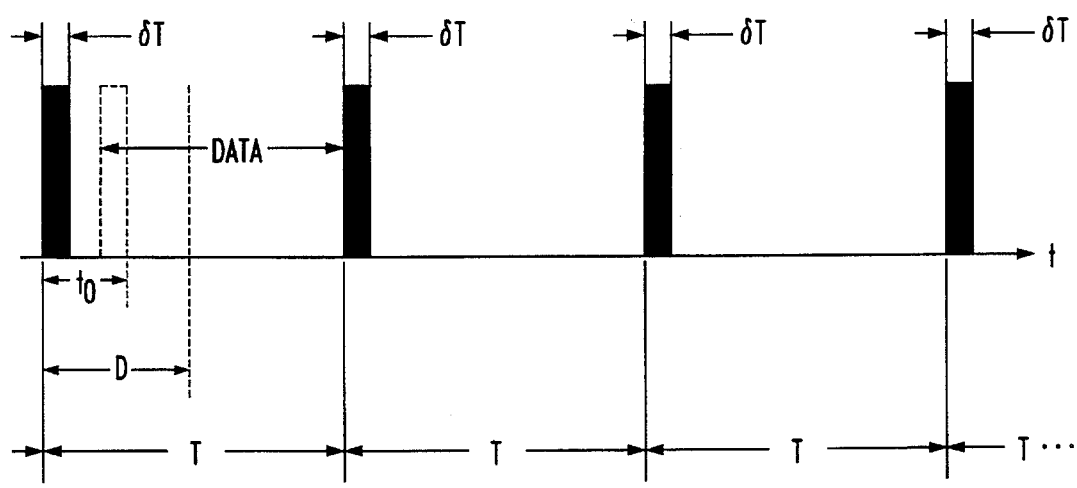
FIG. 5 is an exemplary time frame format for use in the present interrogator system.

The interrogator 10 of FIG. 1 employs a serial open-ring network arrangement. In this arrangement, a frame marker generator 18 is located at the headend of a bus 14 for dividing the time on bus 14 into equal frames of duration T, as shown in FIG. 5. The markers transmitted by frame marker generator 18 at the beginning of each frame serve as a source of synchronization for the entire network and consist of a periodic light modulated sequence of bits, of duration δ T, transmitted every T seconds, with δ T<<T. This function can also be incorporated on a standby basis within the first few SITEs along bus 14 to increase the reliability of the system in case of a failure of the frame marker generator 18 at the head-end of bus 14. Alternatively, the frame marking function can be directly performed within the first SITE $11_i$ in place of frame marker generator 18 with the next few succeeding SITEs providing standby operation. Each of the SITEs $11d$ to $11_N$ appropriately formats the signals from each of the M users located thereat into separate packets of information and, after detecting the markers from frame marker generator 18 and then sensing that a frame is not being used by previous SITEs on bus 14, the SITE transmits a packet of information onto bus 14 during a detected empty frame period.

Referring next to FIGS. 2A, 2B, 2C and 3A, 3B, 3C, in combination, there are shown the basic structures of the jacket 40 and the smart card 20. The smart card 20 typically is a personal memory card or data card which is usable in a variety of applications, from custom repertory dialing to storage of individual medical and/or banking records. Although the card looks and feels much like an ordinary credit card, the smart card includes a computer, an electrically erasable field-programmable read-only memory and also circuitry for inductively receiving a power signal and capacitive transferring data signals between the card and associated card reader/writer circuitry within the interface circuitry located in the jacket 40. No direct ohmic electrical contact is made between the card and the reader/writer circuitry in the jacket for transferring power to the card 20 via the reader/writer circuitry or for transferring data to and from the card. The card is also reprogrammable by a specially designated interrogator 10 via the reader/writer circuitry in the jacket 40 with new and different data as desired.

Memory cards suitable for use as smart card 20 are known in the art and commercially available from AT&T and other suppliers. Such cards also are described in U.S. Pat. No. 4,795,898 which issued to H. L. Bernstein et al. on Jan. 3, 1989; U.S. Pat. No. 4,816,653 which issued to E. C. Anderl et al. on Mar. 28, 1989; and U.S. Pat. No. 4,882,474 which issued to E. C. Anderl et al. on Nov. 21, 1989. A card reader/writer suitable for use as the reader/writer circuitry in the jacket 40 is described in U.S. Pat. No. 4,798,322 which issued to H. L. Bernstein et al. on Jan. 17, 1989.

The jacket 40 includes a sleeve-like opening adapted to receive and position the smart card 20 for providing the operating power from the jacket to the card and also for enabling read/write communications between the card 20 and the associated interrogator 10. Normally held in the off-state, radiated energy from an interrogation SITE associated with the interrogator 10 turns on the jacket's internal battery operated power supply when the smart card/jacket combination is within a few feet of the radiation source at the interrogation SITE. A holder of the smart/card jacket combination is able to conduct, or have conducted for him or her as appropriate, a data transaction with the interrogator 10 either while standing near or moving through an interrogation SITE for the interrogator. When the smart card/jacket combination is outside of the field of the radiated energy from the interrogation SITE, power to all the circuitry in the jacket and the card are turned off, thereby extending the operating life for the battery operated power supply.

Figure 2A:
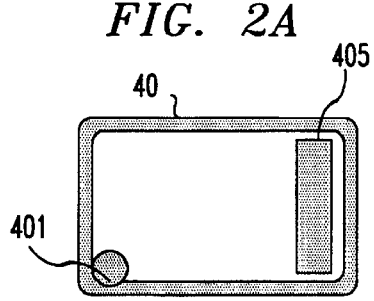
FIG. 2A is a view of the top surface of one of the radio frequency jackets illustrated in FIG. 1.
Figure 2C:
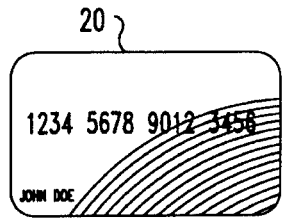
FIG. 2C is the top surface view of one of the smart cards illustrated in FIG. 1.
Figure 2B:
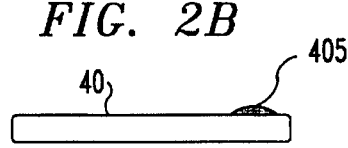
FIG. 2B is a side view of the radio frequency jacket illustrated in FIG. 2A.

The top surface and a side view of the jacket 40 are depicted in FIGS. 2A and 2B. Also, the smart card 20 is also shown in FIG. 2C, while removed from the jacket 40. The jacket 40 includes a battery 401 for providing operating power for the electronics therein and for providing operating power to the smart card 20. An optional liquid crystal display (LCD) 405 may be provided on the top surface of the jacket 40 for informing the holder of the card of the results of a particular transaction. Although not shown, a keypad may also be provided on the top surface of the jacket 40 if desired.

Figure 3A:
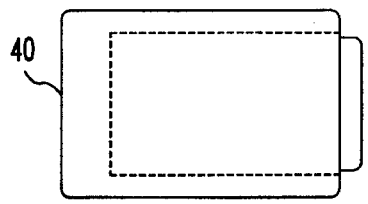
FIG. 3A is a top view of a radio frequency jacket and a smart card as they appear when the smart card is inserted into the jacket.
Figure 3B:
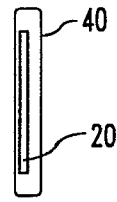
FIG. 3B is one side view of the arrangement of FIG. 3A.
Figure 3C:
FIG. 3C is another side view of the arrangement of FIG. 3A.

The smart card 20 is depicted inserted in the jacket 40 in FIGS. 3A, 3B and 3C. An edge of the card extends slightly beyond the right surface of the jacket 40, as depicted in FIGS. 3A and 3C, to facilitate the removal and insertion of the card into this jacket.

Figure 4:
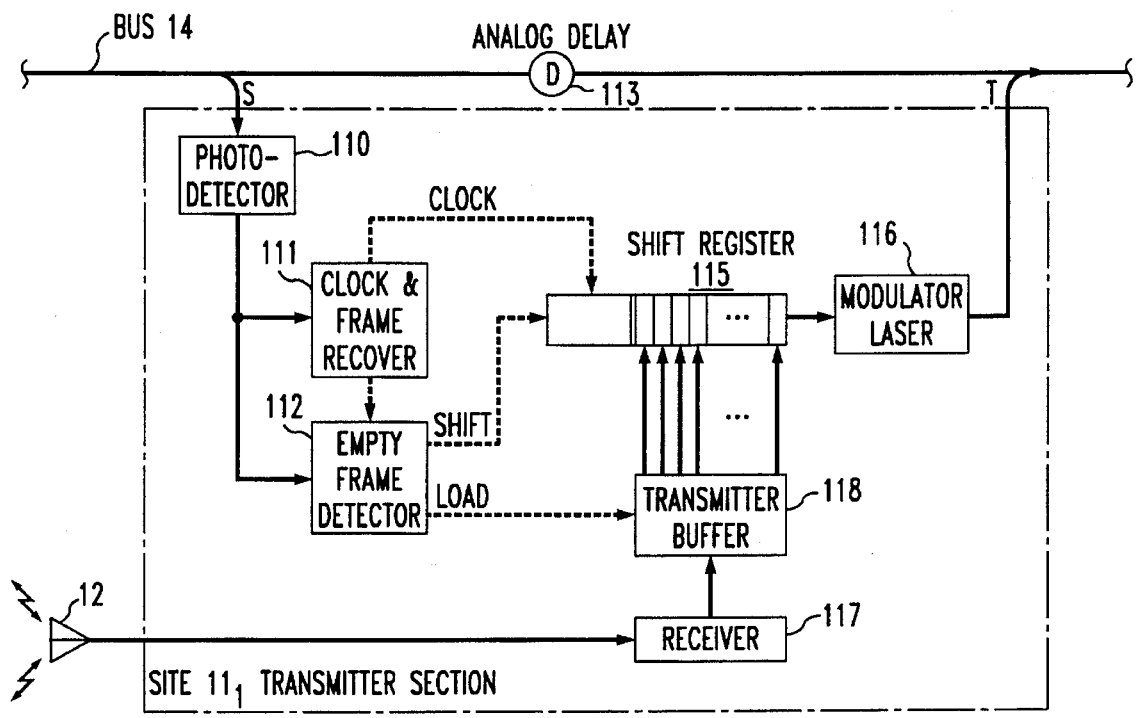
FIG. 4 is a block diagram of an exemplary site transmitter interface for the interrogator system of FIG. 1.

Referring once again to the interrogator 10, there is shown in FIG. 4 a block diagram of a transmitter section for a SITE $11_i$ which receives its signal from bus 14. In the transmitter section of FIG. 4 a small part of the light-modulated bit stream from serial bus 14 is demodulated by a photo detector 110 to, for example, baseband. This demodulated signal is received by both a clock and frame recovery circuit 111 and an empty frame detector 112. Clock and frame recovery circuit 111 functions to recover the frame markers generated by frame marker generator 18 (in FIG. 1) out of which a bit clock is generated. The empty frame detector 112 receives the recovered frame markers from recovery circuit 111 and scan the frame during the time interval $t_o$, shown in FIG. 5, to determine whether the frame is occupied or not by a packet of information transmitted by one of the prior SITEs 11 on bus 14. Time interval $t_o$ may typically be δ T plus a few bits in duration, or $t_o$ approximates δ T.

If the frame is occupied with a packet of information transmitted by one of the preceding SITEs 11, this packet of information will continue traveling on bus 14, in the arrangement of FIG. 4, through analog delay 113 preferably with very low attenuation. If attenuation is too great, a laser light source (not shown) may be employed for amplifying and sending the modulated packet of information forward.

If one or more users in the arrangement of FIG. 4 has transmitted a signal to a SITE $11_i$, this signal is received by the SITE's antenna 12 for delivery to a receiver 117. It is to be understood that all users $1-M_i$ can transmit asynchronously at a SITE $11_i$ using any suitable technique described hereinbefore, and that receiver 117 is arranged to receive such asynchronously transmitted signals and process them separately. Receiver 117 functions to collect the information received from each user, formats the information of each user by adding any required overhead protocol, buffers the formatted packet(s) if necessary, and transmits each formatted packet to a transmitter buffer 118 at the appropriate time.

Upon the receipt of a "Load" enable signal from empty frame detector 112, transmitter buffer 118 transfers the packet stored therein in a parallel manner into a very fast shift register 115. When empty frame detector 112 generates a "shift" enable signal, the packet in shift register 115 is delivered in serial fashion to modulator laser 116 at the bit clock rate from the clock and frame recovery circuit 111 for transmission onto serial bus 14. The delay D in FIG. 5, which is analog in the arrangement of FIG. 4 is of sufficient duration to enable the multiplexing of a packet of information from transmitter buffer 118 into a frame on the bus once that same frame is determined to be unoccupied. The delay D is approximately equal to $t_o$ plus, for example, up to 20 bits in duration.

This interface protocol is collision-free and, therefore, very efficient. As long as there is a packet of information available for transmission in the transmitter buffer 118, it will be multiplexed onto bus 14 in the immediately detected unoccupied frame. When a packet of information becomes available in the transmitter buffer 118 past the decision of an unoccupied frame by empty frame detector 112, it will have to wait until the next unoccupied frame comes along.

Figure 6:
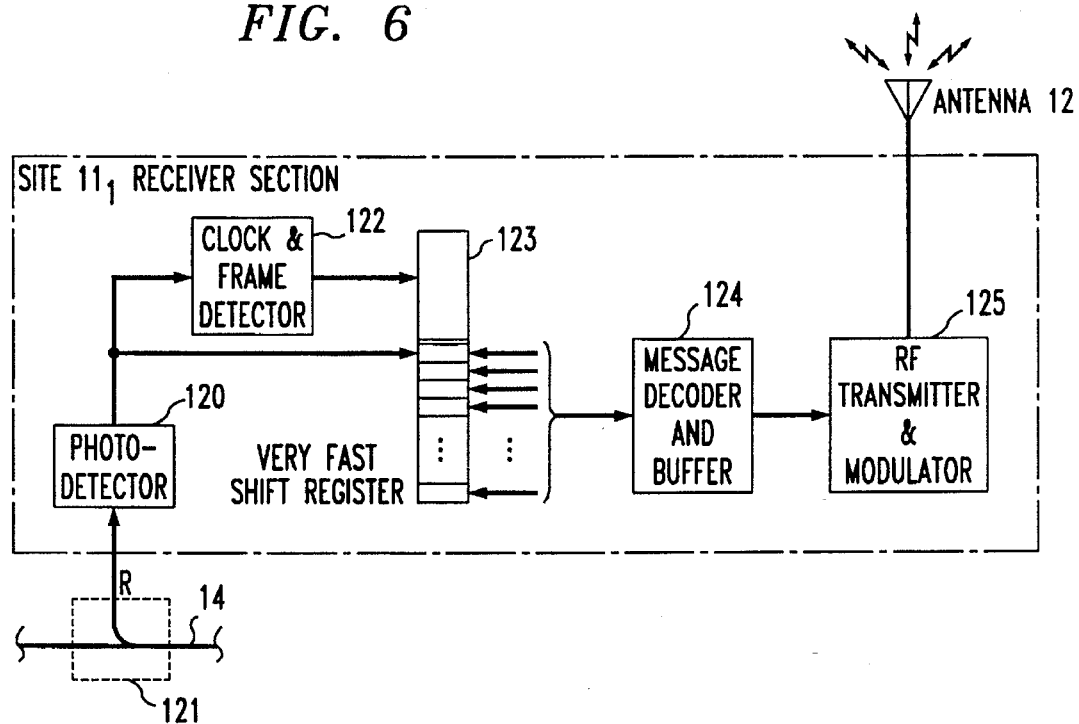
FIG. 6 is a block diagram of an exemplary site receiver interface in for the interrogator system of FIG. 1.

Referring next to FIG. 6, there is shown the architecture of the receiver section of an SITE $11_i$ for the network arrangement of FIG. 1. In this section, a small portion of the light modulated bit stream propagating along bus 14 is received by a photo detector 120 via an R-directional coupler 121. Photo detector 120 functions in the manner described for photo detector 110 in the transmit section of a SITE 11. The demodulated signal from photo detector 120 is delivered to both a clock and frame detector circuit 122, which recovers the clock and frame markers from the received bit stream, and a very fast shift register 123 into which the received bit stream is serially fed. In response to enable signals from detector 122, register 123 is unloaded in parallel into a message decoder and buffer 124.

In the message decoder and buffer 124 a decision is made, based upon the address or destination provided in the overhead portion of the packet of information, whether to discard or store the message in an included buffer. More particularly, if a packet of information includes an address destination for one of the users then associated with this particular SITE, the packet of information is buffered, otherwise it is discarded. Messages stored in decoder and buffer 124 are then modulated in a low power radio frequency transmitter and modulator 125 and broadcasted by antenna 12, to all users then associated with that particular SITE.

Figure 7:
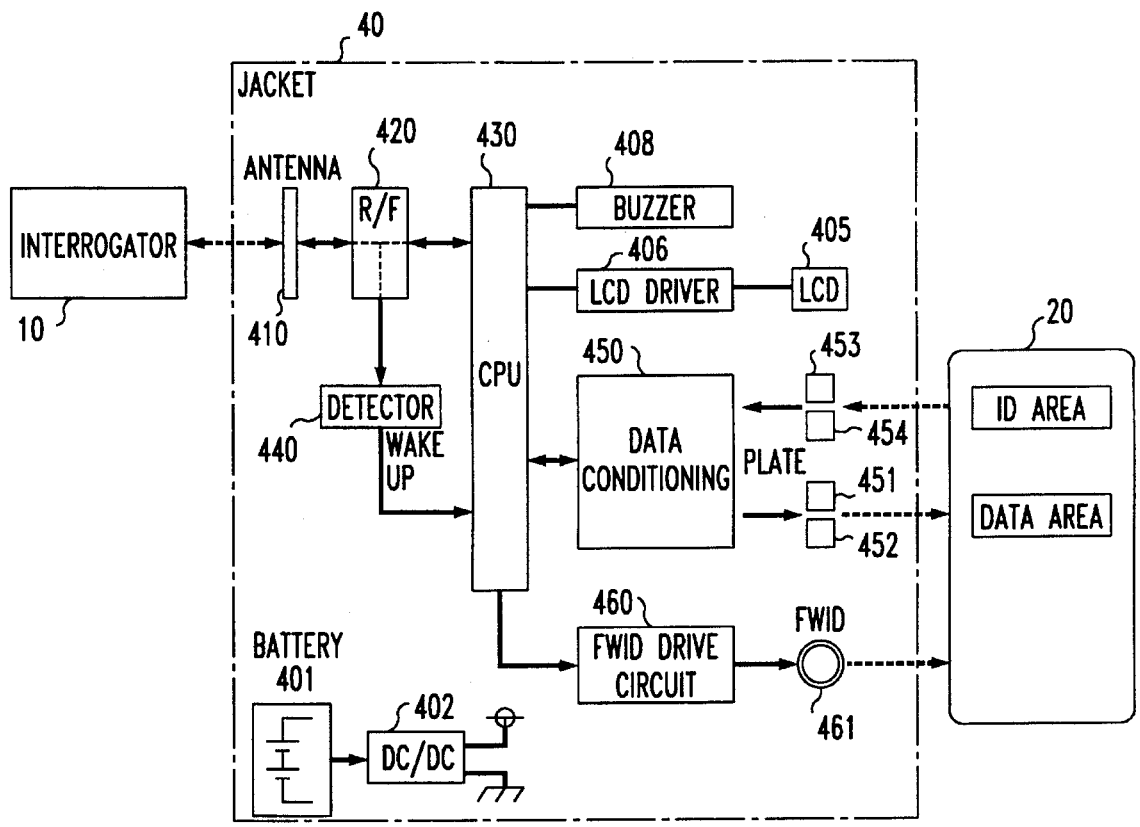
FIG. 7 is a block diagram of exemplary interface circuitry in the radio frequency jacket for providing communications between the interrogator and the smart card, in accordance with the present invention.

Referring next to FIG. 7, there is shown a high level block diagram of the interface circuitry in the jacket 40 for providing communications between the interrogator 10 and the smart card 20. The interrogator 10 continually radiates a low level interrogating signal, typically on a frequency channel at 2.4 GHz. This signal is radiated at a level sufficient to generate an electrical field reflective of a desired size of an area of operation for each interrogation SITE.

While outside an area of operation for an interrogation SITE, the jacket 40 is maintained in a completely OFF state. While in this state, there is no requirement for signal monitoring electronics to be maintained in the active state. Thus standby current consumption is eliminated and the life of the battery 401 in the jacket 40 is substantially prolonged. Alternatively, if a rechargeable battery is employed as battery 401, the time between charges of this battery is substantially increased. This advantageous operation is achieved by a detector circuit 440 described in a copending U.S. patent application Ser. No. 08/086401, filed on Jul. 6, 1993. Through use of this detector circuit, all current consuming circuits in the jacket and card are permitted to remain completely off while the jacket is outside an area of operation for an interrogation SITE.

As a holder of the card and jacket enters an area of operation of the interrogator 10, the radio frequency signal energy radiated by an antenna 12, at an interrogation SITE for the interrogator 10 is captured by the antenna 410. This energy is coupled to the radio-frequency (R/F) section 420 which is used by the jacket 40 in transmitting data to and receiving data from the interrogator 10. This captured energy is also coupled through the R/F section 420 to the detector circuit 440, which provides a means for configuring a central processing unit CPU 430 from an OFF state to a full ON operating state. Thus the captured energy on the antenna 410, while the jacket 40 is in an area of operation of the interrogator 10, activates the detector 440.

The CPU 430 advantageously provides a number of control functions. It provides, for example, a means for interfacing the smart card 20 to the interrogator 10. Operating under firmware control provided by its internal ROM, the CPU 430 formats data provided to the smart card 20 via the data conditioning circuit 450 and to the interrogator 10 via the R/F section 420. The CPU 430 also interprets commands from the interrogator 10 received through the R/F section 420 as appropriate. In addition, the CPU 430 checks for errors in reading and writing data to the smart card 20 and in transmissions to and from the interrogator 10.

The data conditioning circuit 450 receives serial data from the CPU 430 and differentially drive capacitive plates 451 and 452 which interface with respectively aligned capacitive plates (not shown) in the smart card 20. The data conditioning circuit 450 converts the serial data from the CPU 430 which is of one polarity, into a differential polarity such that for each transition of the signal from the CPU 430, a potential on one of the capacitive plates goes positive, while a potential on the other capacitive plate goes negative.

The data conditioning circuit 450 also receives differential data from the capacitive plates (not shown) in the smart card 20 that are brought in close proximity with and aligned with the capacitive plates 453 and 454 in the jacket 40. This data from the smart card 20 is coupled to the CPU 430 in the jacket 40 for coupling on to the interrogator 10.

Hysteresis is built into the data conditioning circuit 450 such that a differential pulse greater than the hysteresis is all that is required to switch the output of the data conditioning circuit 450 to the capacitive plates 451 and 452 from a high state to a low state or from a low state to a high state. The hysteresis also aids in preventing noise from causing false triggering of receive circuitry in the data conditioning circuit while receiving data from the smart card 20 by ignoring small differential noise signals and switching only on large differential data signals. Thus once the receive circuitry in the data conditioning circuit 450 switches states, if there is no further input, this receive circuitry will remain in whatever state it is then switched into and not drift back to the other state.

The CPU 430 also provides a means for activating the smart card 20. Once the CPU 430 enters the full ON operating state, it provides an actuation signal to a flexible wafer inductor (FWID) drive circuit 460. This circuit receives its power from the battery 401 which has the voltage stepped up to an appropriate operating level by a DC to DC converter circuit 402. Power to the card 20 is provided from the FWID drive circuit 460 via a FWID 461 which comprises the primary winding of a transformer. This primary winding comprises a multiturn coil of electrically conductive material and a ferrite core positioned to direct the transmission of magnetic energy into a flat multiturn coil (not shown) located in the smart card 20. The transformer is formed when this primary winding in the jacket 40 is mated to the secondary winding in the smart card 20. A transformer suitable for use in coupling power into the card from the jacket is disclosed by R. L. Billings in U.S. Pat. No. 4,692,604 which issued on Sep. 8, 1987.

The CPU 430 also provides a means for providing a user interface so that a holder of the card 20 will be informed when a transaction has taken place, either because of the information that is shown on a visual display such as provided by the LCD driver 406 and LCD 405 or an audible indication provided by a buzzer 408.

Figure 8:
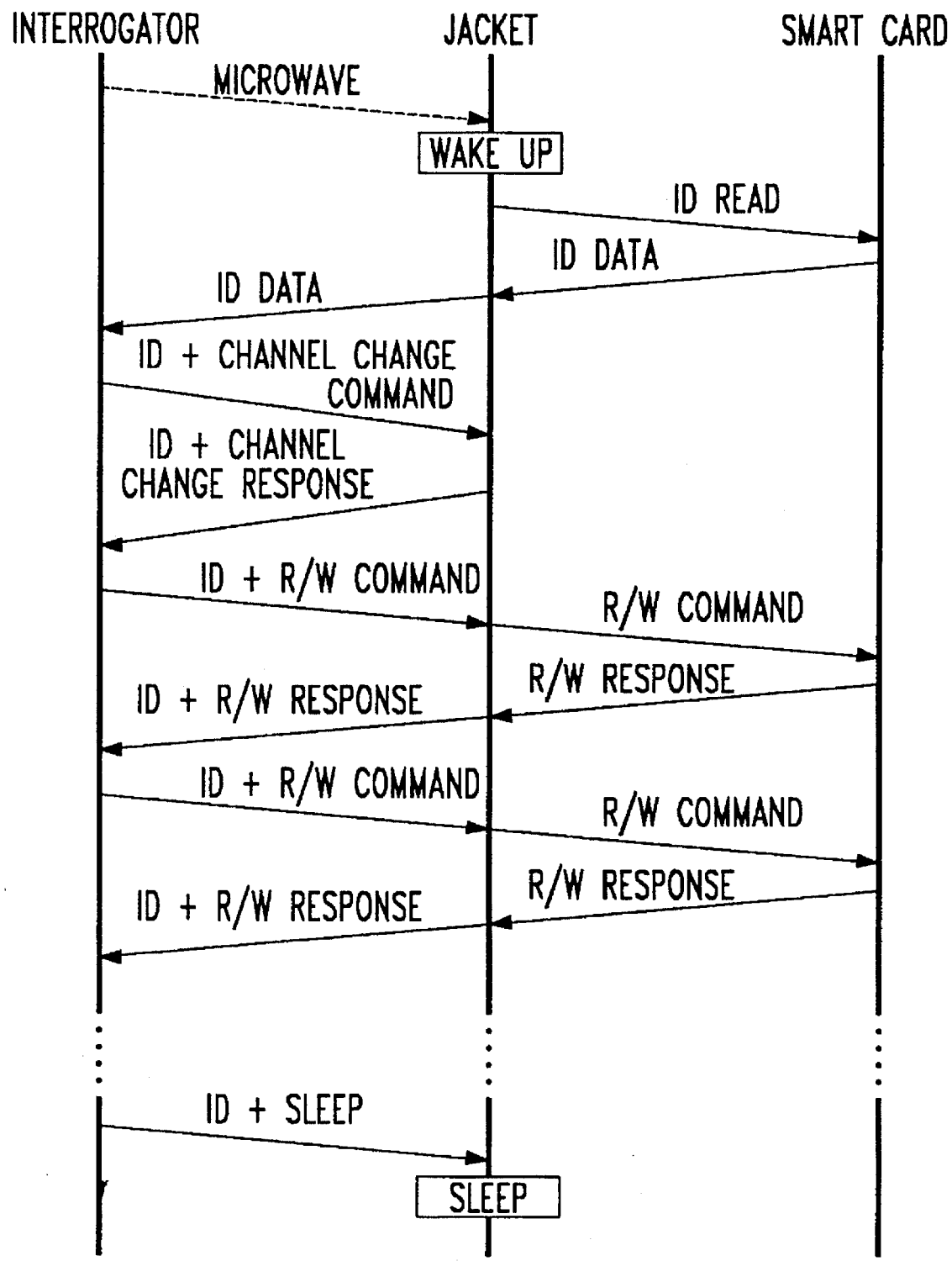
FIG. 8 is a simplified diagram for illustrating the interaction between the interrogator, the jacket and the smart card for facilitating two-way radio frequency read/write communications, in accordance with the present invention.

Referring next to FIG. 8, there is shown a simplified diagram for illustrating the interaction between the interrogator, the jacket and the smart card for facilitating two-way read/write communications over a radio frequency channel. Power to the jacket 40, and thus to the card 20 are turned off when these units are outside of the reception range of an interrogation SITE associated with an interrogator. The jacket 40 thus normally resides in a power OFF state thereby conserving battery life, in accordance with the invention.

As earlier indicated herein, the interrogator 10 continually radiates a low level interrogating signal, typically at 2.4 GHz which covers the proximate desired area of operation for each interrogation SITE. As a holder of the card enters the area of operation of the interrogation SITE, the radio frequency signal radiated by the antenna 12 of the interrogator results in an activation signal being provided to the CPU 430 in the jacket 40. Once the CPU 430 wakes up, it provides power to the smart card 20 and also generates and sends :its own interrogation signal to the smart card for the card to provide its identification (ID) data to the interrogator 10. The ID data provided by the card uniquely identifies a particular card to the interrogator 10. Upon receiving the query, the smart card 20 generates its ID data and returns this information to the interface circuitry in the jacket 40. The jacket in turn couples this ID data to the interrogator 10.

The interrogator 10 receives this ID data and then sends a channel change command plus the ID data back to the jacket 40. As earlier indicated herein, the initial data between the jacket and the interrogator are quickly exchanged over a special set-up RF channel reserved for that purpose. Once the initial data is exchanged the interrogator directs the jacket to one of a plurality of RF communication channels wherein all subsequent and more lengthly data between the interrogator and the jacket/card is exchanged. This arrangement advantageously expedites the movement of, for example, people through electronic barriers by allowing each SITE to accommodate many simultaneous users.

To facilitate the flow of people, once each person is identified as a card user, the interrogator permits these users to quickly move past the electronic barrier. In order to complete the transaction, however, once the user is through the electronic barrier, the smart card/jacket must continue to communicate with the service provider. To guard against a user attempting to defraud the interrogator system by not completing the required communications once beyond the electronic barrier and in an open area, intelligence advantageously is included on the card and in the interrogator system that will effectively lock the card and prevent the ID data from being subsequently read from the card in any attempted future transactions. This essentially renders the card inoperative and forces the user to return the card to the service provider to reopen the card. A card containing a security file system and suitable for locking the card in the manner described herein below is disclosed in U.S. Pat. No. 4,882,474.

Once the jacket has moved to one of the communication channels available at the interrogator, the interrogator issues a read/write (R/W) command plus the ID data back to the jacket 40. Included in this R/W command is an optional locking command that temporarily configures the card to go in a locked condition in the absence of receipt of further commands from the interrogator. Thus once a user is provided access beyond an electronic barrier through generation of the ID data, the transaction with the interrogator must be allowed to be completed or the card will be put in a locked condition. Provided in the last R/W command of the transaction from the interrogator to the card is a lock reset command which effectively overrides the locking command previously provided from the interrogator to the card.

If a user is somehow capable of rendering his or her card such that it only provides ID data out to the interrogator, this also will be detected by the interrogator system. The data base provided by host 17 will detect each incomplete transaction. It is also updatable in that it will store the ID data then being provided thereto for comparison of any previously provided ID data wherein a transaction was incompleted. For either of these occurrences, an alerting signal is generated at an attendant's station in the vicinity of the electronic barrier for providing an indication signal to the attendant that a bogus card is then being used in the system.

All R/W commands are accompanied by the ID data to prevent the interrogator 10 from erroneously affecting the data in any other similarly configured, nearby smart card which also might have inadvertently, for example, moved to the wrong communication channel or is actively communicating with the interrogator 10 at a different interrogation SITE.

The R/W command from the interrogator may be provided in a number of forms. It may be provided in a form which debits an account in the smart card while the holder is in the vicinity of the interrogation SITE. When a holder uses a public transit system such as a subway, for example, the card is initially read and the location of entry entered into the card. Then as the holder of the card leaves the subway, the appropriate amount is debited from the account in the smart card. This command may also be provided in a form which appends to an account in the smart card. Further, The read/write command may simply allow entrance to some limited access area or location to the holder of the card having the provided 1D data once the holder provides some additional identifying information, such as, for example, a voice print.

Once the R/W command is received from the jacket 40 by the smart card 20, the appropriate action in the smart card is executed and a response for the interrogator 10 is generated. The jacket 40 couples the R/W response along with the ID of the smart card to the interrogator 10 for providing an indication that the appropriate action in the card has been taken. If necessary, other commands are generated by the interrogator 10 and responded to by the smart card 20. Once the final command has been responded to by the card 20, the interrogator sends a sleep command to the jacket accompanied by the ID of the card and jacket. The CPU 430 then turns itself, and all of the interface circuitry in the jacket 40, off. This, in turn, turns off the power to the smart card 20. The jacket is thus returned to its power OFF state.

Figure 9:
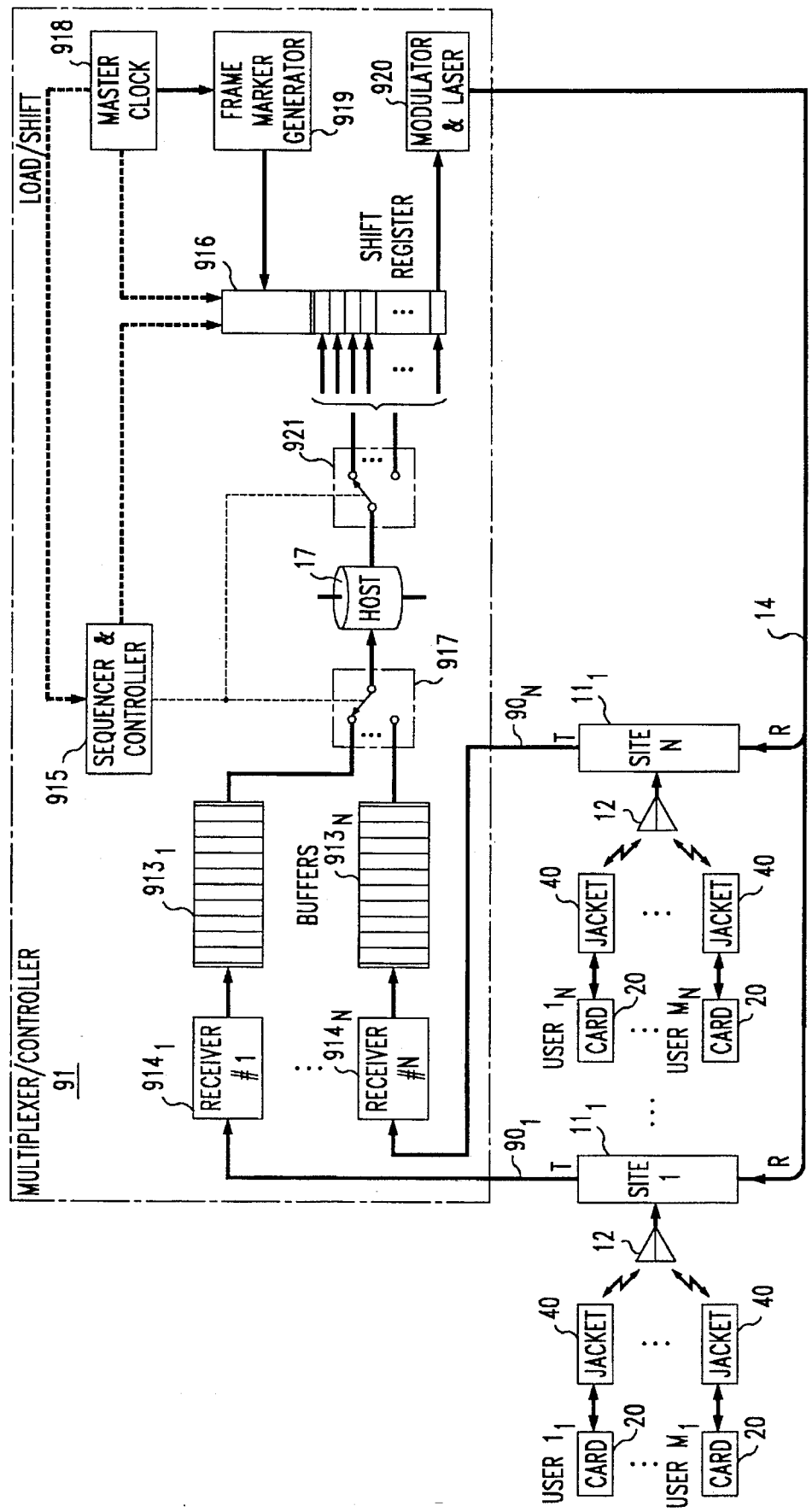
FIG. 9 is a block diagram of an alternative interrogator system for interfacing with multiple smart cards and radio frequency jackets in accordance with the present invention.

FIG. 9 is a block diagram of an alternative interrogator system for interfacing with multiple smart cards and radio frequency jackets. This system is in the form of a parallel transmit/serial receive network. In this network, the interchange between the users, the SITEs 11, and the receiver bus is similar to that described hereinbefore for the network of FIG. 1. However, since the SITEs $11_1$ to $11_N$ now transmit the formatted packets of information on separate buses $90_1$ to $90_N$, respectively, to a Multiplexer/Controller (M/C) 91, the transmissions between the SITEs 11 and M/C 91 are at the SITE rate and can be asynchronous. In the parallel transmit part of the network of FIG. 9, the SITEs $11_1$ to $11_N$ independently deposit their packets of information in buffers $913_1$ to $913_N$, respectively, via respective receivers $914_1$ to $914_N$. A sequencer and controller 915 cyclically controls the sending serially of the packets of information to the host 17 via the switching means 917. The packets of information are processed by the host 17 and updated information is provided from the host 17 for transmission back to the system users. From the host 17, the packets of information are coupled to a switching means 921 for loading, in parallel, of the packets of information into a very fast shift register 916.

A master clock 918 in M/C 91 controls the data transfer between buffers 913, switching means 917 and 921, and register 916 as well as the fast serial shifting of the bits from the frame marker generator 919 into a modulator and laser circuit 920. Frame marker generator 919 functions as described for frame marker generator 18 in the interrogator 10 of FIG. 1 to insert a marker at the beginning of each packet to be sent over bus 14. In circuit 920, the laser is modulated by the serially received packet of information from register 916. The modulated bit stream is fed into the high-speed bus 14 where the transmission is synchronous.

Flexibility can be built, under software control, into M/C 91 for multiplexing the packets of information from the various buffers 913 onto bus 14. For example, one or a fixed number of packets of information from each buffer 913 could be cyclically multiplexed, or each buffer 913 could be emptied of its packets of information before preceding to the next buffer. Priorities could also be easily assigned to certain buffers 913 under program control. From a hardware point of view, the network of FIG. 9 is simpler than the serial network of FIG. 1, since neither the Sense (S) and Transmit (T) directional couplers nor the laser 116 and very fast shift register 115 in the transmitter of each SITE 11 are needed. The lower speed of the parallel transmissions on buses $40_1$ to $40_N$ of FIG. 9 permits the use of, for example, multimode fibers and LED sources for the lightwave network of FIG. 9. The only disadvantage is the need for more buses in the parallel transmit connection. The very high-speed components, however, would still be needed in the receiver sections of the SITEs 11 of FIG. 9 as well as in M/C 91, which is shared by all SITEs 11.

It is to be understood that the above-described embodiments are simply illustrative of the principles of the invention. Various other modifications and changes may be made by those skilled in the art which will embody the spirit and scope thereof. For example, the interrogator system can be adapted to interrogate items being moved on a conveyer belt, freight boxcars as they move in and out of freight yards, and long haul trucks at weight stations, etc. All that is necessary is to have a smart card/jacket affixed to the desired unit and have this unit pass within the proximity of an interrogation SITE for the interrogator. Thus other applications to smart cards, computers or other user interrogation systems other than the disclosed system are contemplated as being within the knowledge of one skilled in the art and may be utilized without departing from the spirit and scope of the present invention.

I claim:

1. An interrogator for remotely interrogating a portable data card, the interrogator being operable over a plurality of radio frequencies and comprising:

means for communicating with the portable data card on a first one of the plurality of radio frequencies for determining a unique identification number associated with the data card;

means for initiating a predetermined transaction responsive to receipt of the unique identification number by the interrogator;

means for completing the predetermined transaction while communicating with the card on a second one of the plurality of radio frequencies, the interrogator reading data from and writing data to the card while operating over said second one of the plurality of radio frequencies; and means for transmitting a locking command and a subsequent lock reset command to the card, the locking command being registered in the card and being disabled by the lock reset command issued by the interrogator in response to the interrogator completing the predetermined transaction.

2. The interrogator of claim 1 wherein the initiation means includes activation means for gaining access to a limited access area, the activation means deactivating an electronic barrier to entering said limited access area.

3. The interrogator of claim 1 wherein a first read/write command from the interrogator to the card in a transaction includes the locking command.

4. The interrogator of claim 3 wherein a last read/write command from the interrogator to the card in a transaction includes the lock reset command.

5. The interrogator of claim 4 wherein in the absence of the predetermined transaction being completed by the completion means, the locking command remains registered in the card for disabling the card.

6. In an interrogation system for remotely interrogating a plurality of portable data cards, an interrogator operable over a plurality of radio frequencies and comprising:

means for sequentially communicating with each portable data card on a first one of the plurality of radio frequencies for determining a unique identification number associated with each data card;

means for initiating a predetermined transaction for each card responsive to receipt of said unique identification number associated with each card by the interrogator; and means for completing the predetermined transaction while respectively communicating simultaneously with each card on a different selected one of the plurality of radio frequencies, the interrogator reading data from and writing data to each card while operating on said selected one of the plurality of radio frequencies.

7. The interrogation system of claim 6 wherein the initiation means includes activation means for gaining access to a limited access area, the activation means deactivating an electronic barrier to entering said limited access area.

8. A method of remotely interrogating a portable data card from an interrogation station, the interrogation station being operable over a plurality of radio frequencies, the method comprising the steps of:

communicating with the portable data card on a first one of the plurality of radio frequencies for determining a unique identification number associated with the data card;

initiating a predetermined transaction responsive to receipt of the unique identification number by the interrogation station;

completing the predetermined transaction while communicating with the card on a second one of the plurality of radio frequencies; and transmitting a locking command to the card and transmitting a subsequent lock reset command to the card, the locking command initially being registered in the card upon receipt and being disabled in the card upon receipt of the lock reset command, the lock reset command being issued by the interrogation station in response to the interrogation station completing the predetermined transaction.

9. The method of claim 8 wherein the initiation step includes the step of deactivating an electronic barrier for gaining access to a limited access area controlled by said barrier.

* * * * *